(12) United States Patent
Sharifi

(10) Patent No.: US 12,264,935 B2
(45) Date of Patent: Apr. 1, 2025

(54) INCORPORATING CURRENT AND ANTICIPATED PARKING LOCATIONS INTO DIRECTIONS SUGGESTIONS

(71) Applicant: Google LLC, Mountain View, CA (US)

(72) Inventor: Matthew Sharifi, Kilchberg (CH)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/772,037

(22) PCT Filed: Dec. 16, 2021

(86) PCT No.: PCT/US2021/063784
§ 371 (c)(1),
(2) Date: Apr. 26, 2022

(87) PCT Pub. No.: WO2023/113802
PCT Pub. Date: Jun. 22, 2023

(65) Prior Publication Data
US 2024/0011789 A1 Jan. 11, 2024

(51) Int. Cl.
*G01C 21/36* (2006.01)
*G01C 21/34* (2006.01)

(52) U.S. Cl.
CPC ..... *G01C 21/3685* (2013.01); *G01C 21/3423* (2013.01)

(58) Field of Classification Search
CPC ............. G01C 21/3685; G01C 21/3423
See application file for complete search history.

(56) References Cited

U.S. PATENT DOCUMENTS

| | | | |
|---|---|---|---|
| 9,076,336 B2 | 7/2015 | Tippelhofer et al. | |
| 9,360,333 B2 | 6/2016 | Tuukkanen et al. | |
| 9,377,319 B2 | 6/2016 | San Filippo et al. | |
| 2015/0006075 A1* | 1/2015 | Rad | G08G 1/147 |
| | | | 701/540 |

(Continued)

FOREIGN PATENT DOCUMENTS

EP  3690854 A2  8/2020

OTHER PUBLICATIONS

International Search Report and Written Opinion for International Application No. PCT/US2021/063784 dated Aug. 29, 2022. 13 pages.

(Continued)

*Primary Examiner* — Seth A Silverman
(74) *Attorney, Agent, or Firm* — Lerner David LLP

(57) ABSTRACT

The technology relates to a navigation system that provides one or more routes from a starting location to a destination location, including a candidate parking location at or near the destination location. The starting location may be the current location of a user or the parking location from a previous navigation session. In some examples, the current location of the user may be the same location as the parking location from the previous navigation session. Each route suggestion may include one or more segments. For example, a route may include a first segment from the location of the user to the candidate parking spot and a second segment may be from the candidate parking location to the destination location. In some examples, there may be a third segment from the user's current location to the parking location from the previous navigation session.

27 Claims, 10 Drawing Sheets

(56) References Cited

U.S. PATENT DOCUMENTS

| | | | |
|---|---|---|---|
| 2015/0051833 A1* | 2/2015 | Geelen | G08G 1/14 |
| | | | 701/532 |
| 2016/0107646 A1 | 4/2016 | Kolisetty et al. | |
| 2017/0229018 A1* | 8/2017 | Levy | G01C 21/3617 |
| 2018/0047288 A1* | 2/2018 | Cordell | G06V 20/58 |
| 2019/0362630 A1* | 11/2019 | Guseynov | G08G 1/0141 |
| 2020/0111268 A1* | 4/2020 | Montague | G06Q 50/30 |
| 2020/0173808 A1 | 6/2020 | Beaurepaire et al. | |
| 2020/0191587 A1 | 6/2020 | Fuchs | |
| 2021/0064065 A1* | 3/2021 | Chen | G05D 1/106 |

OTHER PUBLICATIONS

Finding Your Last Parking Spot, [online] [retrieved Apr. 14, 2022]. Retrieved from the Internet: <https://www8.garmin.com/manuals/webhelp/drive51-61/EN-US/GUID-DCA28FEF-2075-4A2B-9633-B568789C52B8.html>, 1 page.

Ion, Florence and PCWorld staff, "Google Maps: Find Parking and other features you need to start using", PCWorld, Aug. 29, 2017, 8 pages.

* cited by examiner

INCORPORATING CURRENT AND ANTICIPATED PARKING LOCATIONS INTO DIRECTIONS SUGGESTIONS

CROSS-REFERENCE TO RELATED APPLICATIONS

This application is a national phase entry under 35 U.S.C. § 371 of International Application No. PCT/US2021/063784, filed Dec. 16, 2021, the disclosure of which is hereby incorporated herein by reference.

BACKGROUND

Users may use navigation systems to find a route from their current location to an intended destination location. The user may provide one or more inputs regarding their route preference. For example, a user may wish to avoid toll roads or highways. In some instances, a user may want to receive the fastest route to the intended destination location, and in other instances, the user may want to receive the shortest route to the destination location. Some navigation systems are capable of utilizing current traffic when determining a route suggestion to that location.

Upon arriving at the destination location, parking can often be difficult, particularly on-street parking in cities or crowded geographic areas. Having difficulty finding parking causes vehicles to spend more time on the road network as motorists drive in circles around their intended destination location looking for parking. This additional time on the road network adds to fuel/energy consumption in the vehicles, may increase congestion and pollution in and around the road network, and wastes time for the drivers and any passengers in the vehicles.

BRIEF SUMMARY

The technology generally relates to a navigation system that provides routes from a starting location to a destination location, including candidate parking locations at or near the destination location. The starting location may be the location of a user or a parking location from a previous navigation session. According to some examples, the current location of the user may be the same location as the parking location from the previous navigation session. Each route suggestion may include one or more segments. For example, a first segment may be from the location of the user to the candidate parking location, and a second segment may be from the candidate parking location to the destination location. In some examples, there may be three segments including a first segment from the current location of the user to the parking location from the previous navigation session, a second segment from the parking location from the previous navigation session to the candidate parking location, and a third segment from the candidate parking location to the destination location. The navigation system may provide the route suggestions. In some examples, the navigation system may provide the routes to be output by a device, such as a smartphone, AR/VR headset, smartwatch, etc.

One aspect of the disclosure includes a method comprising receiving, by one or more processors, a request for directions to a destination location, determining, by the one or more processors in response to the request for directions and based on a previous navigation session, a starting location, identifying, by the one or more processors based on the destination location, one or more candidate parking locations, computing, by the one or more processors based on the starting location, the destination location, and the identified candidate parking locations, at least one route, wherein the at least one route includes at least two segments including a first segment from the starting location to one of the identified candidate parking locations and a second segment from the one of the identified candidate parking locations to the destination location, and providing, by the one or more processors, the at least one route indicating each of the first and second segments.

The method may further comprise determining, by the one or more processors based on the previous navigation session, a start facing direction for the at least one route, wherein the start facing direction corresponds to a last facing direction from the previous navigation session. The starting location may include a current location of a user or a parking location from the previous navigation session. According to some examples, the method may further comprise computing, by the one or more processors, a third segment from the current location of the user to the parking location from the previous navigation session, and providing, by the one or more processors, the at least one route indicating the third segment.

The method may further comprise determining, by the one or more processors, that the current location of the user is different from the parking location from the previous navigation session. According to some examples, when the current location of the user is different from the parking location from the previous navigation session, the method may further comprise, computing, by the one or more processors, a third segment from the current location of the user to the parking location from the previous navigation session, and providing, by the one or more processors, the at least one route further indicating the third segment.

The method may further comprise providing two or more routes, wherein each of the two or more routes are ranked based on route preferences. Route preferences may include at least one of total travel time, total travel distance, cost of parking, maximum duration of parking, or type of parking. In some examples, the method may further comprise determining, by the one or more processors, a first mode of transportation for the first segment and a second mode of transportation for the second segment different than the first mode of transportation.

Another aspect of the disclosure includes a device comprising a memory and one or more processors coupled to the memory. The one or more processors may be configured to receive a request for directions to a destination location, determine, in response to the request for directions and based on a previous navigation session, a starting location, identify, based on the destination location, one or more candidate parking locations, compute, based on the starting location, the destination location, and the identified candidate parking locations, at least one route, wherein the at least one route includes at least two segments including a first segment from the starting location to one of the identified candidate parking locations and a second segment from the one of the identified candidate parking locations to the destination location, and provide the at least one route indicating each of the first and second segments.

Yet another aspect of the disclosure includes a non-transitory computer readable storage medium storing instructions, which when executed by one or more processors, cause the one or more processors to receive a request for directions to a destination location, determine, in response to the request for directions and based on a previous navigation session, a starting location, identify, based on the destination location, one or more candidate parking locations, compute, based on the starting location, the destination location, and the identified candidate parking locations, at least one route, wherein the at least one route includes at least two segments including a first segment from the starting location to one of the identified candidate parking locations and a second segment from the one of the identified candidate parking locations to the destination location, and provide the at least one route indicating each of the first and second segments.

Another example embodiment of the techniques of the present disclosure is a method of navigating a user to a destination. The method may involve navigating a pedestrian user from a current location to a destination location with intermediate use of a vehicle. The method may involve determining a parking location for the vehicle, which parking location is different from a/the destination location.

In the manner described above, aspects of the present disclosure provide a technical solution to the problem of inaccurate route computation in a navigation system. Conventional navigation systems may fail to take account of vehicle parking requirements or restrictions placed on a route due to parking considerations. This may lead to computation of an inaccurate route, e.g. assuming that a vehicle is parked at a current location of a user and/or assuming that a vehicle can be parked at a/the destination location. It may also lead to a user having to adjust a route manually, or to have multiple interactions with the navigation system to allow the navigation system to compute different segments of the route individually, e.g. from a current location of a user to a parking location, from the parking location to a candidate parking location (e.g. near to the destination location) and/or from a/the candidate parking location to the destination location. Consequently, conventional navigation systems may be inaccurate or cumbersome to use. By contrast, the method of the present disclosure may provide a technical advantage by computing an accurate route with reduced user interaction.

DETAILED DESCRIPTION

Figure 1A:
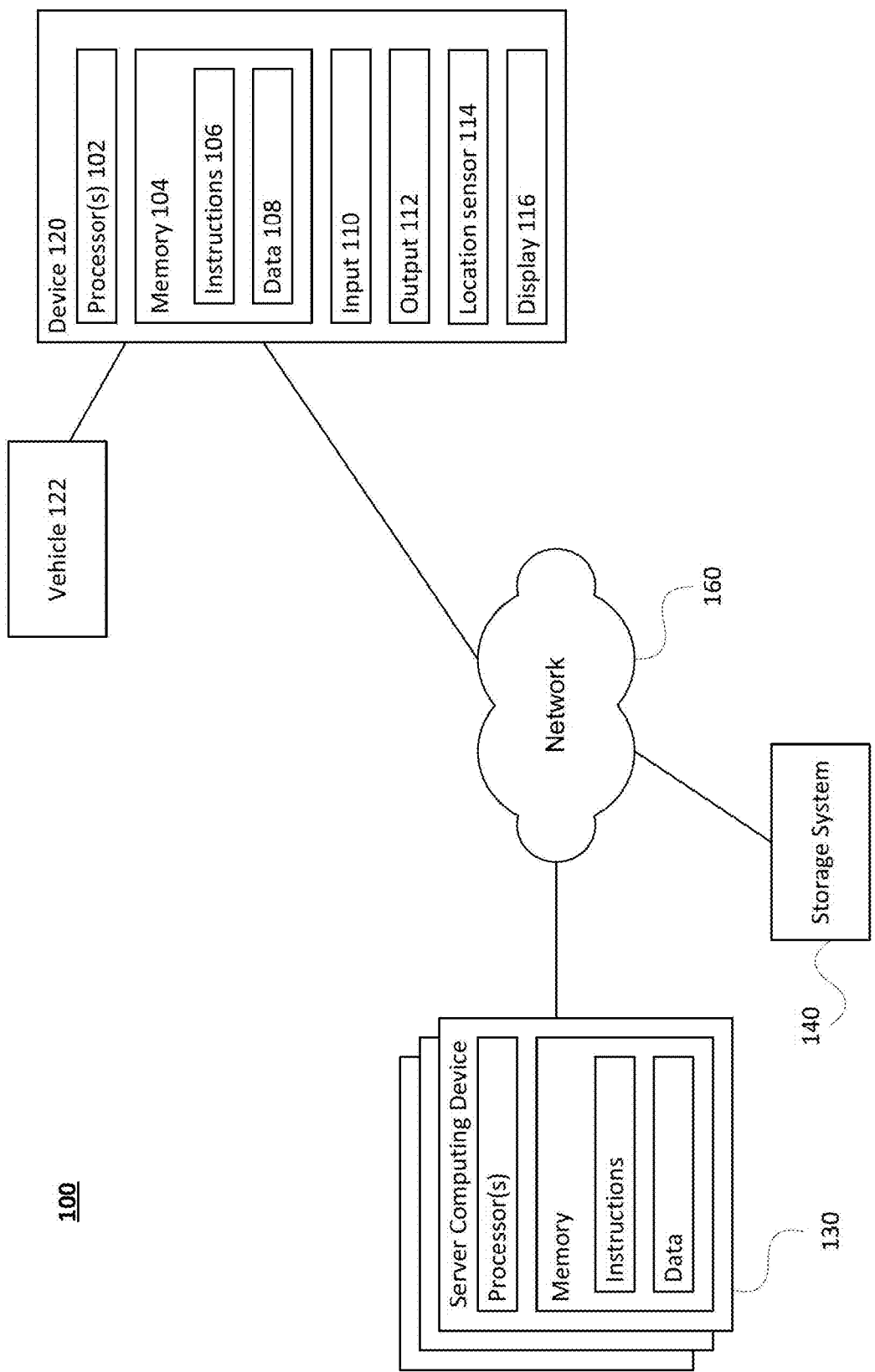
FIGS. 1A and 1B are functional diagrams of an example system in accordance with aspects of the disclosure.

The technology generally relates to a navigation system that provides one or more route suggestions starting at the location of a user or a parking location from a previous navigation session to a destination location. The route suggestions may include a candidate parking location at or near the destination location. The navigation system may be provided on a user device, such as a smartphone, smartwatch, AR/VR headset, tablet, in-vehicle navigation system, etc.

The route suggestions may include one or more segments. For example, the route may include a first segment from the starting location to a candidate parking location near the destination location and a second segment from the candidate parking location to the destination location. Candidate parking locations may include one or more likely available parking spots at or near the destination location. Each segment may use the same and/or different modes of transportation. For example, the first segment from the starting location to the candidate parking location may be suggested using a first mode of transportation, such as driving, and the second segment from the candidate parking location to the destination location may be suggested using a second mode of transportation, such as walking.

According to some examples, the one or more route suggestions may include a third segment. The third segment may include directions from a current location of the user to a parking location from a previous navigation session. For example, the user may have used the navigation system in a first session, during which a driving segment concluded with parking the user's car in a parking location. The first session may have included subsequent segments using a different transportation mode, such as walking. Additionally, or alternatively, the user may have ended the first navigation session for a period of time before commencing a second navigation session. At the time the user commences the second navigation session, the user may be at a different location than the parking location from the first navigation session. The navigation system may provide one or more route suggestions that include a first segment from the current location of the user to the parking location from the first navigation session. The route suggestions may further include a second segment from the parking location to a second candidate parking location at or near a second destination location for the second navigation session and/or a third segment from the second candidate parking location to the second destination location.

Candidate parking locations may be determined based on information pertaining to the destination location and/or the geographical area surrounding the destination location. For example, the navigation system may store information regarding whether the destination location has an on-site parking lot, whether street parking, parking garages, parking lots are available in the graphical area surrounding the destination location, the cost of parking at any given location, historical parking availability, parking restrictions, etc. The navigation system may use this information along with any route preferences set by the user to determine if there are candidate parking locations likely to be available along the route to the destination location. Route preferences may include shortest distance, shortest duration, lowest cost parking, avoiding a certain type of parking (e.g. no on-street parking), duration of parking, maximum stay length, distance of parking to the destination location, etc.

The navigation system may determine the starting location for the one or more route suggestions. The starting location may be the current location of the user or the parking location from the previous navigation session. According to some examples, the navigation system may determine, based on location data received from one or more sensors, whether there has been additional driving since the previous navigation session. The navigation system may include sensors, such as location sensors, motion sensors, etc. The location data may be used to determine whether there has been additional driving since the previous navigation system by comparing the current location of the user and/or vehicle with the parking location from the previous navigation session. In some examples, the motion data may indicate that the user reached the location via another means, such as walking, running, bicycling, etc. Additionally or alternatively, the navigation system may include wireless communication interfaces to detect Wi-Fi signals and/or Bluetooth connections. The Wi-Fi signals may be used to determine location information that can be compared with the parking location from the previous navigation session. In some examples, the Bluetooth connection may be used to determine whether the device was wirelessly connected to a vehicle but navigation was not used. In such an example, the navigation system may determine that there has been additional driving.

In some examples, the navigation system may compare the current location of the user with the parking location from the last navigation session. If the current location of the user matches or is substantially similar to the parking location from the previous navigation session, the navigation system may begin the new navigation session with the current location of the user as the starting location. In examples where the current location of the user does not match or does not substantially correspond to the parking location from the previous navigation session, the navigation system may provide directions from the current location of the user to the parking location from the previous navigation session as part of the one or more route options.

According to some examples, the navigation system may prompt the user to select the starting location. For example, the navigation system may prompt the user to select the current location of the user or the parking location from the previous navigation session as the starting location. Additionally or alternatively, when the current location of the user does not match the parking location from the previous navigation session, the navigation system may prompt the user to select whether they need directions back to the parking location from the previous navigation session.

According to one example, a user may employ the navigation system to get to a first destination location. After spending time at the first destination location, the user may leave and follow another user to a second destination location such that the user does not employ the navigation system to get to the second destination location. The user may employ the navigation system to return home from the second destination location. In such an example, the navigation system may detect, using one or more sensors, that the vehicle is no longer at the first destination location. Accordingly, the navigation system may determine that the starting location for directions home should be the current location of the user rather than the first destination location.

In another example, a user may employ the navigation system to get to a first destination location. The navigation system may provide one or more routes to the first destination location. Each route may include candidate parking locations at or near the first destination location. For example, if the first destination location is a restaurant, the navigation system may identify whether the restaurant has a private parking lot, if there is a nearby parking garage, if there is nearby on-street parking, etc. The navigation system may compare the candidate parking locations based on cost, likely availability, distance from the first destination location, etc. The navigation system may rank the one or more routes based on the compared parking information, total time duration of the trip, total distance of the trip, etc. The one or more routes may be output to the user such that the user can select the route, including candidate parking, they will navigate. The route may be output showing separate segments. The first segment may be from the user location to the candidate parking location and the second segment may be from the candidate parking to the first destination location.

To return or travel to a second destination location, the user may launch the navigation system while at the first destination location. The navigation system may provide one or more routes, including a first segment from the current location of the user to where the user parked and a second segment from where the user parked to their home, i.e. the second destination location. According to some examples, the first or second segments may have a start facing segment. For example, the first segment may have a start facing direction opposite the direction the user traveled to arrive at the first destination location. For example, if the user traveled east to arrive at the first destination location, the start facing direction for the first segment may be westward. The second segment may have a start facing direction corresponding to the last facing direction from the previous navigation session. For example, if the user was driving north and parked on the street facing north, the start facing direction for the second segment may be north.

Example Systems

FIG. 1A illustrates an example system 100 in which the features described above may be implemented. It should not be considered limiting the scope of the disclosure or usefulness of the features described herein. In this example, system 100 includes device 120, server computing device 130, storage system 140, and network 160.

As shown, the device 120 includes various components, such as one or more processors 102, memory 104, and other components typically present in microprocessors, general purpose computers, or the like. Device 120 also includes input 110, output 112, and location sensor(s) 114 such as a global positioning system ("GPS") sensor, wireless communications interface, etc.

The one or more processors 102 may be any conventional processors, such as commercially available microprocessors. Alternatively, the one or more processors may be a dedicated device such as an application specific integrated circuit (ASIC) or other hardware-based processor. Although FIG. 1 functionally illustrates the processor, memory, and other elements of device 120 as being within the same block, it will be understood by those of ordinary skill in the art that the processor, computing device, or memory may include multiple processors, computing devices, or memories that may or may not be stored within the same physical housing. Similarly, the memory may be a hard drive or other storage media located in a housing different from that of device 120. Accordingly, references to a processor or computing device will be understood to include references to a collection of processors or computing devices or memories that may or may not operate in parallel.

Memory 104 may store information that is accessible by the processors 102, including instructions 106 that may be executed by the processors 102, and data 108. The memory 104 may be of a type of memory operative to store information accessible by the processors 102, including a non-transitory computer-readable medium, or other medium that stores data that may be read with the aid of an electronic device, such as a hard-drive, memory card, read-only memory ("ROM"), random access memory ("RAM"), optical disks, as well as other write-capable and read-only memories. The subject matter disclosed herein may include different combinations of the foregoing, whereby different portions of the instructions 106 and data 108 are stored on different types of media.

Data 108 may be retrieved, stored or modified by processors 102 in accordance with the instructions 106. For instance, although the present disclosure is not limited by a particular data structure, the data 108 may be stored in computer registers, in a relational database as a table having a plurality of different fields and records, XML documents, or flat files. The data 108 may also be formatted in a computer-readable format such as, but not limited to, binary values, ASCII or Unicode. Moreover, the data 108 may comprise information sufficient to identify the relevant information, such as numbers, descriptive text, proprietary codes, pointers, references to data stored in other memories (including other network locations) or information that is used by a function to calculate the relevant data.

The instructions 106 can be any set of instructions to be executed directly, such as machine code, or indirectly, such as scripts, by the processor 102. In that regard, the terms "instructions," "application," "steps," and "programs" can be used interchangeably herein. The instructions can be stored in object code format for direct processing by the processor, or in any other computing device language including scripts or collections of independent source code modules that are interpreted on demand or compiled in advance. Functions, methods, and routines of the instructions are explained in more detail below.

The device 120 may further include an input 110. The input 110 may be, for example, a touch sensor, dial, button, or other control for receiving a manual command. The input 110 may, in some examples, be a microphone. The device 120 may also include an output 112. The output 112 may be, for example, a speaker.

Device 120 may further include at least one location sensor 114. The location sensors 114 may provide a rough indication as to the location of the device. According to some examples, the location sensors 114 may be GPS sensors and/or wireless communications interfaces.

Device 120 may include display 116. Display 116 and other displays described herein may be any type of display, such as a monitor having a screen, a touch-screen, a projector, or a television. The display 116 of device 120 may electronically display information to a user via a graphical user interface ("GUI") or other types of user interfaces. For example, as will be discussed below, display 116 may electronically display a map interface with turn-by-turn directions between two or more geographic locations, corresponding road segments, and waypoints to maximize the overall probability of finding an open parking location when searching in a predefined area surrounding the final geographic location.

It should be understood that the device 120 may include other components which are not shown, such as a battery, charging input for the battery, signal processing components, etc. Such components may also be utilized in execution of the instructions 106.

Although FIG. 1A functionally illustrates the processor, memory, and other elements of device 120 as being within the same respective blocks, it will be understood by those of ordinary skill in the art that the processor or memory may actually include multiple processors or memories that may or may not be stored within the same physical housing. Similarly, the memory may be a hard drive or other storage media located in a housing different from that of device 120. Accordingly, references to a processor or computing device will be understood to include references to a collection of processors or computing devices or memories that may or may not operate in parallel.

Figure 1B:
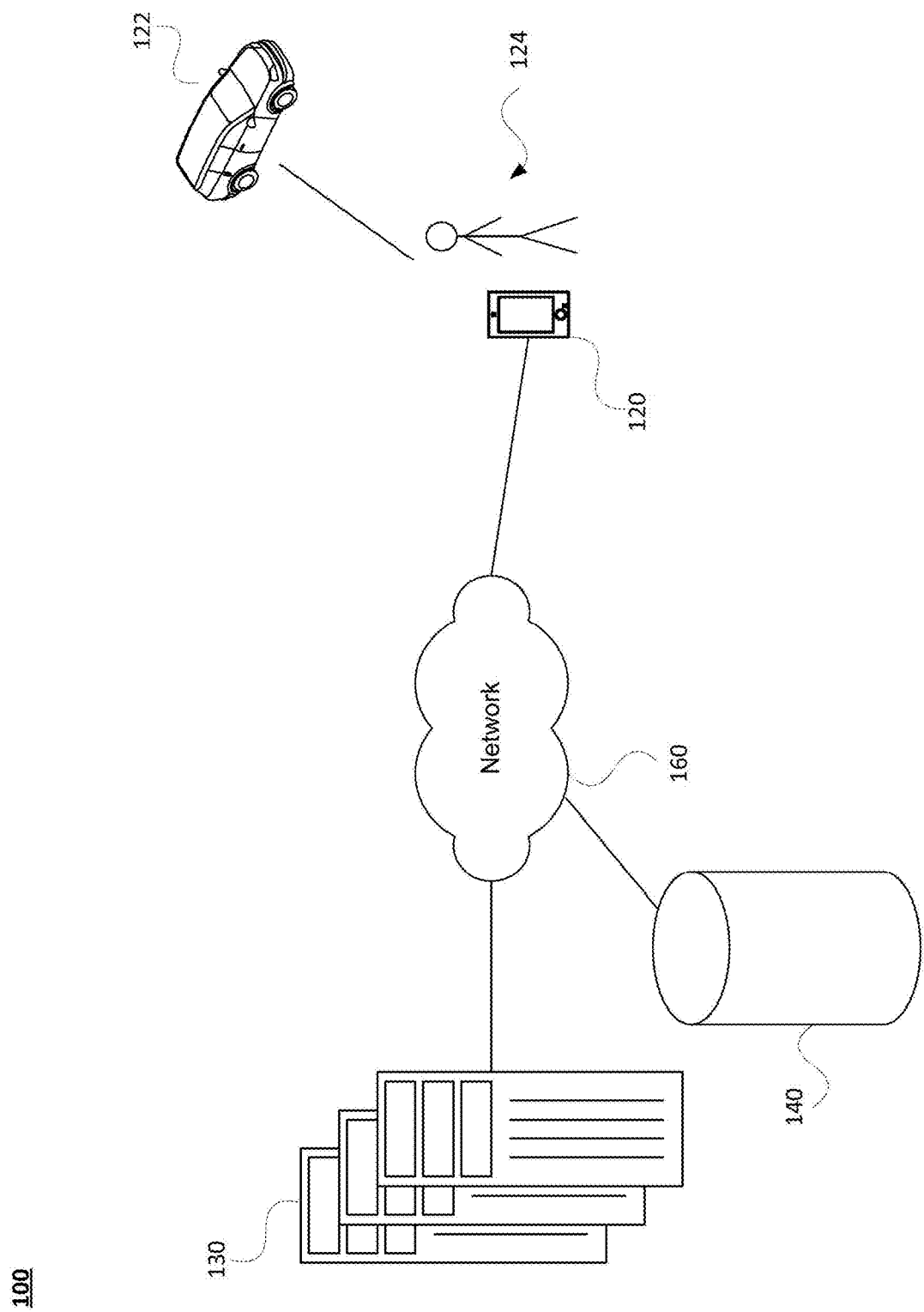

The device 120 may be located at a node of network 160 and capable of directly and indirectly communicating with other nodes of network 160. Although only a single device 120 is depicted in FIGS. 1A and 1B, it should be appreciated that additional devices may be possible. In this regard, a typical system can include a large number of connected computing devices, with each different computing device being at a different node of the network 160.

The network 160 and intervening nodes described herein can be interconnected using various protocols and systems, such that the network can be part of the Internet, World Wide Web, intranets, wide area networks, or local networks. The network can utilize standard communications protocols and systems, such as Ethernet, Wi-Fi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

As an example, each server computing device 130 may include one or more servers capable of communicating with storage system 140 as well as device 120 via the network 160. For example, one or more of server computing devices 130 may use network 160 to transmit and present information to a user on a display of device 120. In this regard, device 120 may be considered client computing devices and may perform all or some of the features described above and herein.

Storage system 140 may store data related to mapping routes and parking availability for retrieval in response to a navigation request. As used herein, a navigation request may be a request for directions between two or more geographic locations. For example, the navigation request may be from a user's current location, to a parking location from a previous navigation session and/or to a destination location, including a candidate parking location at or near the destination location.

In some examples, storage system 140 may include a database. The database may store information, images, and/or metadata that may be provided by an application, such as a search service provider or a mapping application, in response to a search query or request.

As shown in FIG. 1B device 120 may be a personal computing device intended for use by a respective user 124, and have all of the components normally used in connection with a personal computing device including a one or more processors (e.g., a central processing unit (CPU)), memory (e.g., RAM and internal hard drives) storing data and instructions, a display (e.g., a monitor having a screen, a touch-screen, a projector, a television, or other device such as a smart watch display that is operable to display information), and user input devices (e.g., a mouse, keyboard, touchscreen or microphone). The client computing devices may also include a camera for recording video streams, speakers, a network interface device, and all of the components used for connecting these elements to one another. Device 120 may be capable of wirelessly exchanging and/or obtaining data over the network 160.

Although device 120 may comprise a full-sized personal computing device, they may alternatively comprise mobile computing devices capable of wirelessly exchanging data with a server over a network such as the Internet. By way of example only, device 120 may be a mobile phone, smartphone, a wireless-enabled PDA, a tablet PC, a wearable computing device (e.g., a smartwatch, AR/VR headset, earbuds), laptops, hubs, gaming consoles, home assistant devices, an in-vehicle navigation system, or any device that is capable of obtaining information via the Internet or other networks.

The system 100 may provide navigation instructions to an operator of vehicle 122 to reach a destination location and/or find parking for said vehicle 122. Vehicle 122 may include a perception system (not shown). The perception system may include one or more components for detecting and performing analysis on objects external to the vehicle such as other vehicles, obstacles in the roadway, traffic signals, signs, trees, etc. For example, the perception system may include lasers, sonar, radar, one or more cameras, or any other detection devices which record data that may be processed by a computing device (not shown) within vehicle 122. In the case where the vehicle is a small passenger vehicle such as a car, the car may include a laser mounted on the roof or other convenient locations as well as other sensors such as cameras, radars, sonars, and additional lasers (not shown).

While the vehicle is in motion, the perception system may determine that one or more parking locations are available and/or taken using their one or more sensors. The perception system may send this information to server computing device 130 to update system 100 with what parking locations are or are not available. In some instances, the system 100 may update in real time based on the information collected by the perception system. For example, the system may update the availability of parking locations based on the behavior of the vehicles. The behavior of the vehicle may be driving past parking spaces without parking. In other instances, the system 100 may update on a set schedule, such that the information collected by the perception system becomes part of the historical parking availability database Storage system 140 may store various types of information. For instance, the storage system 140 may store historical parking availability, location of parking lanes, parking rules and restrictions, etc. For example, historical parking availability may include information collected by the perception system, as described above. In some instances, system 100 may collect data based on the location a user parked and what time they parked. Alternatively, system 100 may collect data based upon the system detecting that the vehicle did not park in a certain location. The information collected by system 100 may become part of the historical parking availability.

The storage system 140 may store map data. This map data may include, for instance, locations of driving lanes, parking lanes, designated parking areas, no parking zones, drop off locations, etc. Map data may also include locations, road names, road configurations, etc. In some instances, the storage system 140 may store parking rules and regulations, such as alternative side of the street parking, permit parking, overnight parking restrictions, etc.

The storage system 140 may also store log data. This log data may include, for instance, sensor data generated by a perception system indicating available parking locations, such as the perception systems of vehicle 122. Storage system 140 may further store information associated with the parking locations, such as location, street, size, regulations, etc. This information may be retrieved or otherwise accessed by a server computing device, such as one or more server computing devices 130, in order to perform some or all of the features described herein.

Figure 2:
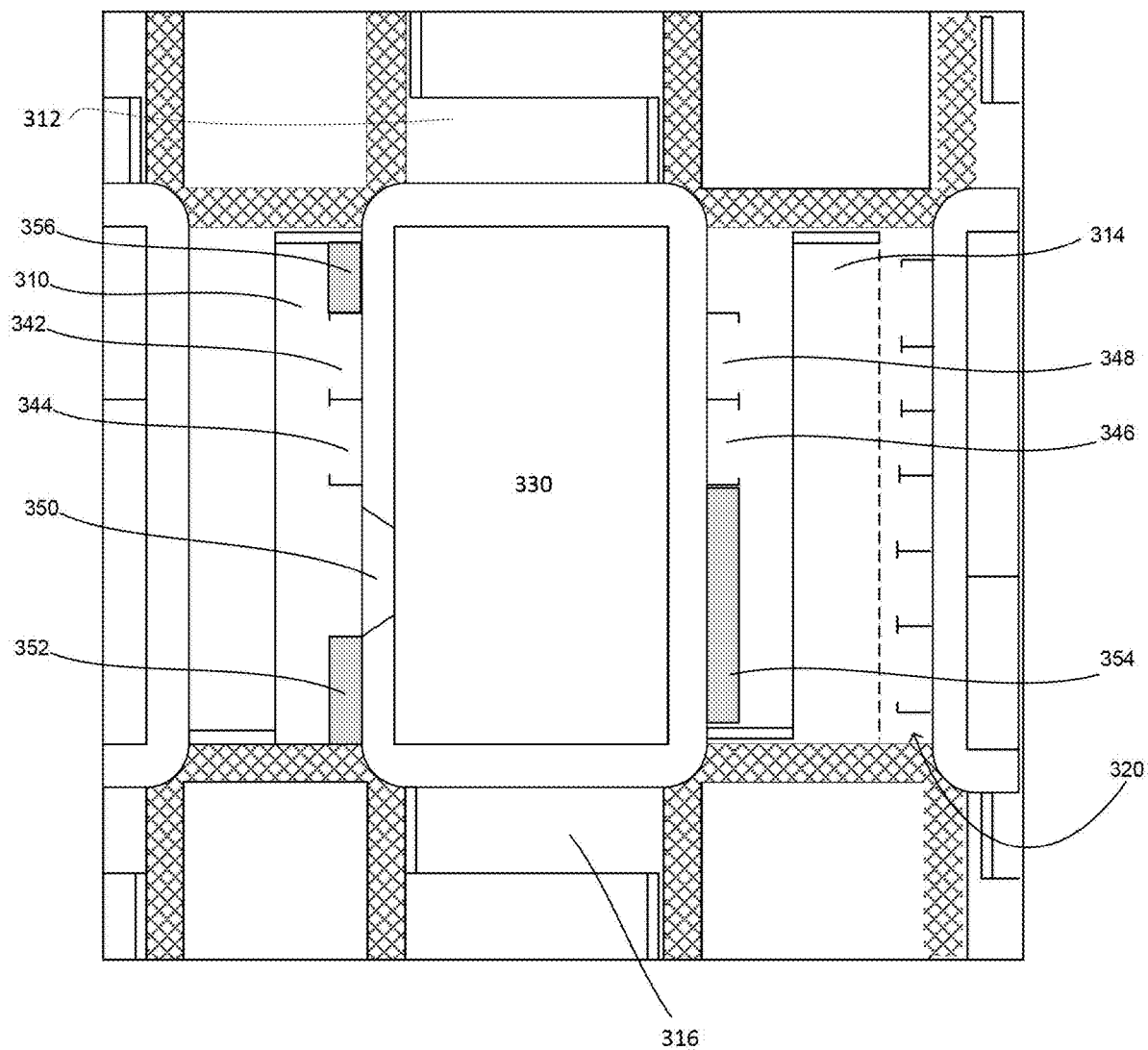
FIG. 2 is a pictorial diagram of a map in accordance with aspects of the disclosure.

FIG. 2 is an example of detailed map data 300 for a city block. In this example, the detailed map data includes a plurality of different features that identify the location of various features such as driving lanes 310, 312, 314, 316, parking lane 320, building 330, on-street parking locations 342, 344, 346, 348, a driveway entrance (for example to a parking garage or other location) 350, and no parking zones 352, 354, 356.

The detailed map data may also include information identifying areas that are predesignated as parking areas. For example, the areas corresponding to on street parking locations 342, 344, 346, 348 or parking locations within parking lane 320 may each be stored in system storage 140 as a predesignated parking area. Some areas may also be pre-designated as areas suitable for brief short term stops to wait for or drop off a passenger, such as an area in front of driveway 350. Similarly, other areas, such as no parking zones 352, 354, 356 may be stored in system storage 140 as a no parking zone. This pre-designation may be performed manually by human review, automatically based on the characteristics of areas (for example, whether there are parking lines defining a parking space or diagonal lines representing a no parking zone, whether an area is sufficiently large for a vehicle of a particular size), machine learning, or a combination of these.

The map data 300 may be used when computing a route. For example, knowing driving lane 314 has an adjacent parking lane 320 may increase the probability of finding an available parking location on a route including driving lane 314. In some instances, the system may use the map data 300 to calculate turn costs by considering whether there is a stop light or stop sign at an intersection. The map data 300 may be displayed on an interface of the client computing device.

Figure 3:
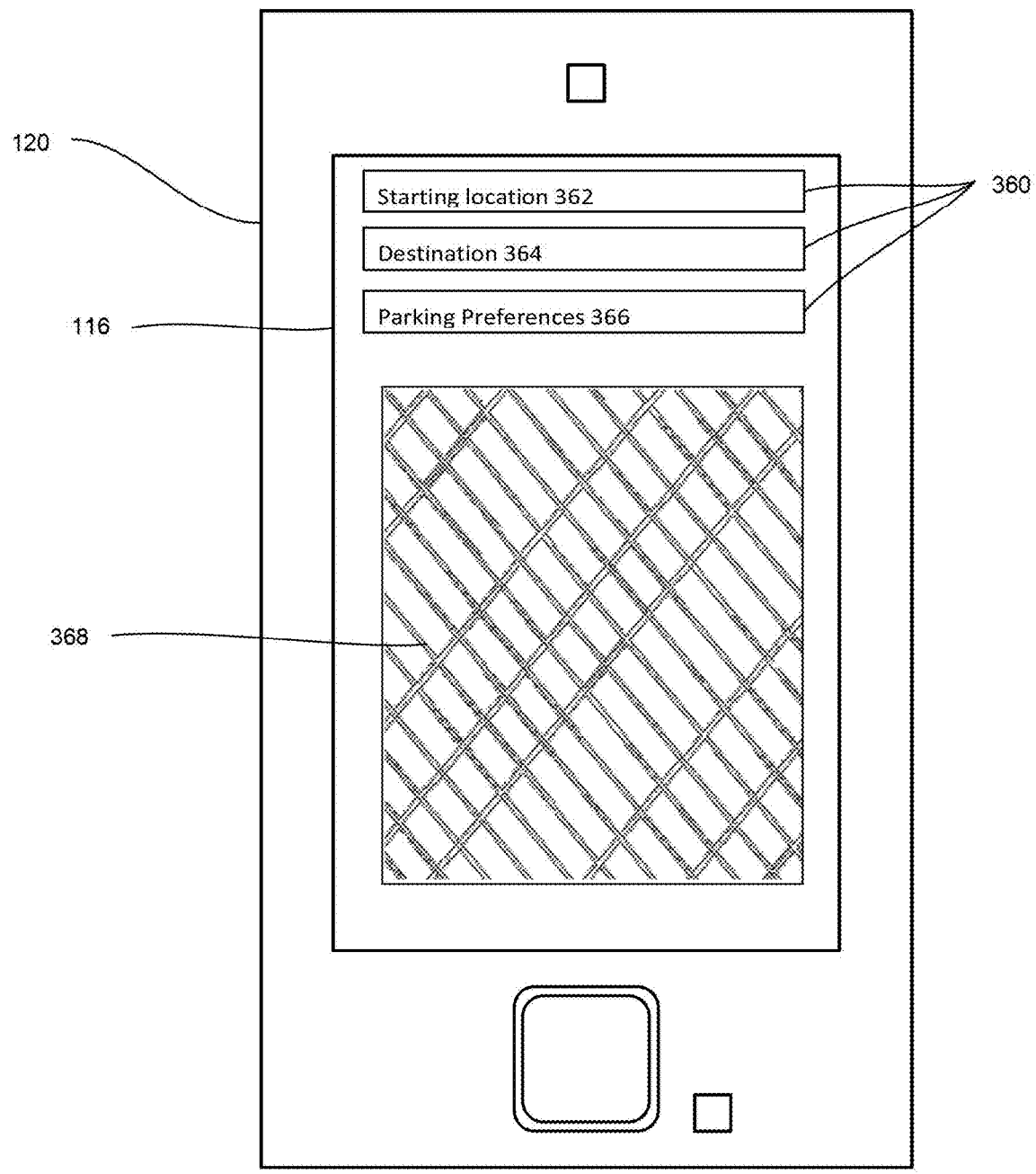
FIG. 3 illustrates an example interface in accordance with aspects of the disclosure.

FIG. 3 is an example interface on the client computing device 120 for user interaction with the system 100 that may be stored in storage system 140. For example, display 116 may show one or more input fields 360 and map 368. The input fields 360 may be, for example, drop down menus, radio buttons, free text, etc. Input fields 360 may be used to indicate, by way of example only, a starting location 362, destination location 364, parking preferences 366, or other route parameters. For example, a user may input a starting location 362 and/or a desired destination location 364, such as an address, business name, landmark, geographic coordinates, etc.

Starting location 362 may be a current location of the user, a parking location from the previous navigation session, or a location chosen by the user. In some examples, the current location of the user may be the same location as the parking location from the previous navigation session. The current location of the user may be determined based on location data provided from a device being used by the user. The parking location from the previous navigation session may be determined based on navigation data. According to some examples, the navigation system may use the current location of the user as the starting location 362.

In some examples, the navigation system may determine whether there has been additional driving since the last navigation session. For example, the navigation system may compare the current location of the user with the parking location from the previous navigation session. If a distance between the current location of the user and the parking location from the previous navigation session is greater than a predetermined threshold, the system may determine that there has been additional driving since the last navigation session. In such an example, the navigation system may use the current location of the user as the starting location instead of the parking location from the previous navigation session.

According to some examples, the navigation system may determine whether there has been additional driving since the last navigation session by determining whether the device has connected to the vehicle via a wireless communication interface without using the navigation system. For example, if after a first navigation session the device has wirelessly connected to the vehicle but did not use the navigation system, the navigation system may determine that there has been additional driving. In such an example, the navigation system may use the current location of the user as the starting location instead of the parking location from the previous navigation session.

In yet another example, the navigation system may determine that the user has reached a given location via an alternative mode of transportation. For example, a user may grant access for the navigation system to access information related to their travel. In such an example, the navigation system may determine the user took public transportation, such as a bus, subway, train, etc., based on their location data. Additionally or alternatively, a user may grant access to the navigation system to access information related to the user's travel, such as ticket purchases, itinerary information, etc. In such an example, the navigation system may use the current location of the user as the starting location instead of the parking location from the previous navigation session.

In some examples, the user may provide a starting location, such as an address, geolocation (e.g., latitude/longitude coordinates), etc.

The map 368 may, in response to a selected destination location, display the selected starting location and/or destination location. In other examples, the user may point to a spot on the map 360 to indicate the desired starting location and/or destination location, and the starting location and/or destination location field 362, 364 may be updated in response to the selection. The user may additionally or alternatively input parking preferences 366, such as a maximum distance from the desired destination location, an expected duration of parking, a preference for free or paid parking, or any of a variety of other preferences.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 4:
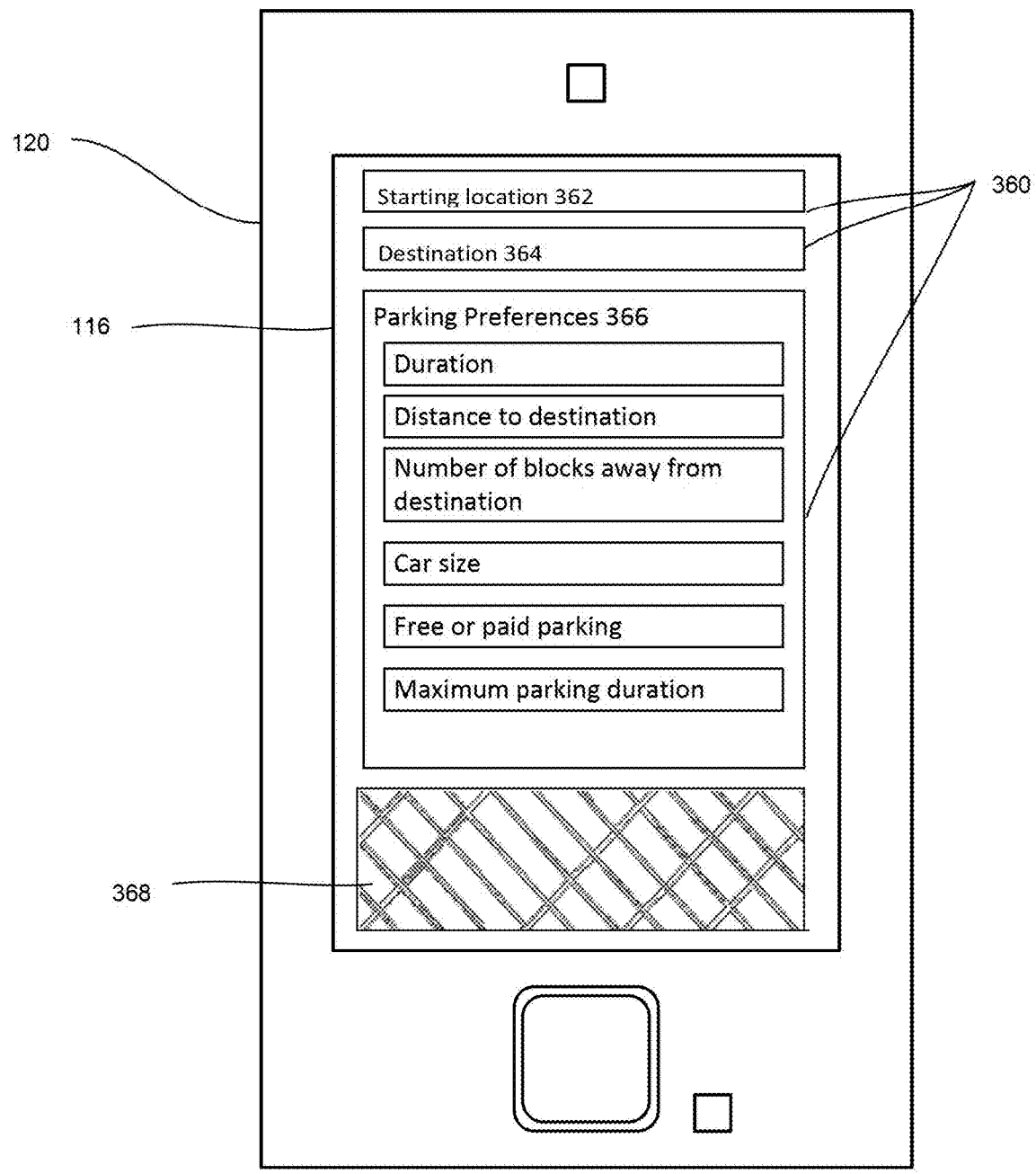
FIG. 4 illustrates another example interface on a computing device in accordance with aspects of the disclosure.

Referring now to FIG. 4, computing device 120 is being shown as being used in conjunction with system 100. The system may receive a request for directions to a destination location, including candidate parking locations. For example, a user may enter information into input fields 360. The user may enter, for example, a starting location 362 and/or an intended destination location 364. According to some examples, the starting location 362 may be the current location of the user, the parking location from a previous navigation session, or a location chosen by the user. The user may also input parking preferences, such as duration, the number of blocks away from the destination location, the distance from the destination location, the car size, free or paid parking, travel time and/or cost to go from the candidate parking location to the destination location, etc., into the preferences field 366. The number of blocks away from the destination location may, for example, set a maximum distance, measured in blocks, away from the final destination location that a user may park. For example, as shown in FIG. 5A, a distance from the destination location 564 may create a maximum radius from the final or intended destination location 564 that a user may wish to park. For example, the distance may be a half-mile (½ mile). Thus, the system may create a search area 572 around destination location 564 that has a radius of half-mile. The system may search for, find, and/or display a navigation route that maximizes the overall probability of finding an open parking location while minimizing the amount of time to find a parking location within that half-mile radius surrounding destination location 564.

Figure 5B:
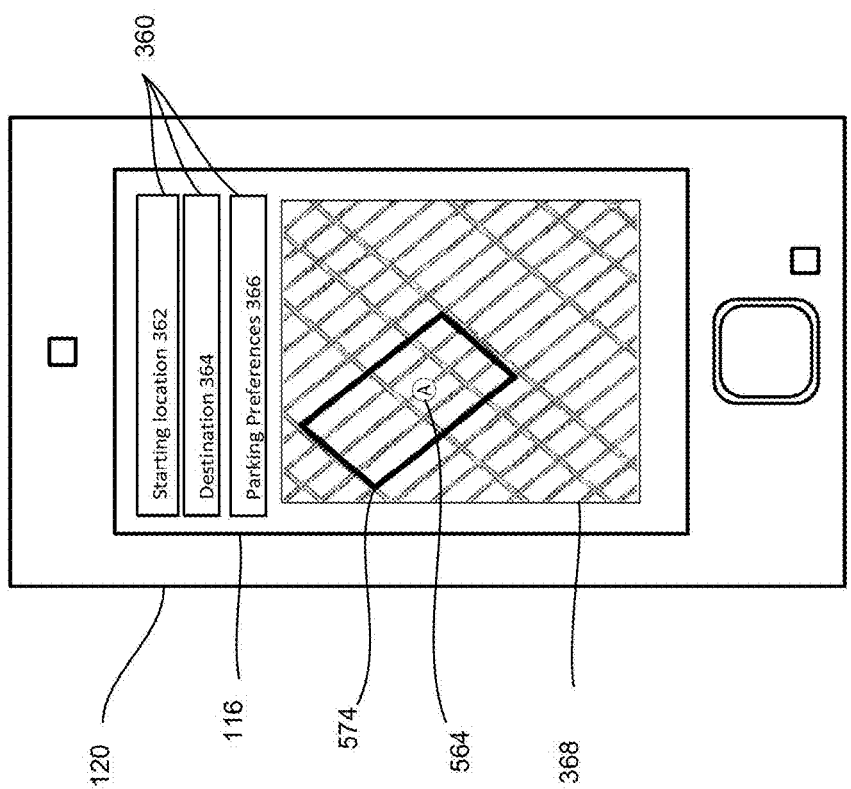
FIGS. 5A and 5B are example displays of a selected geographical area in accordance with aspects of the disclosure.
Figure 5A:
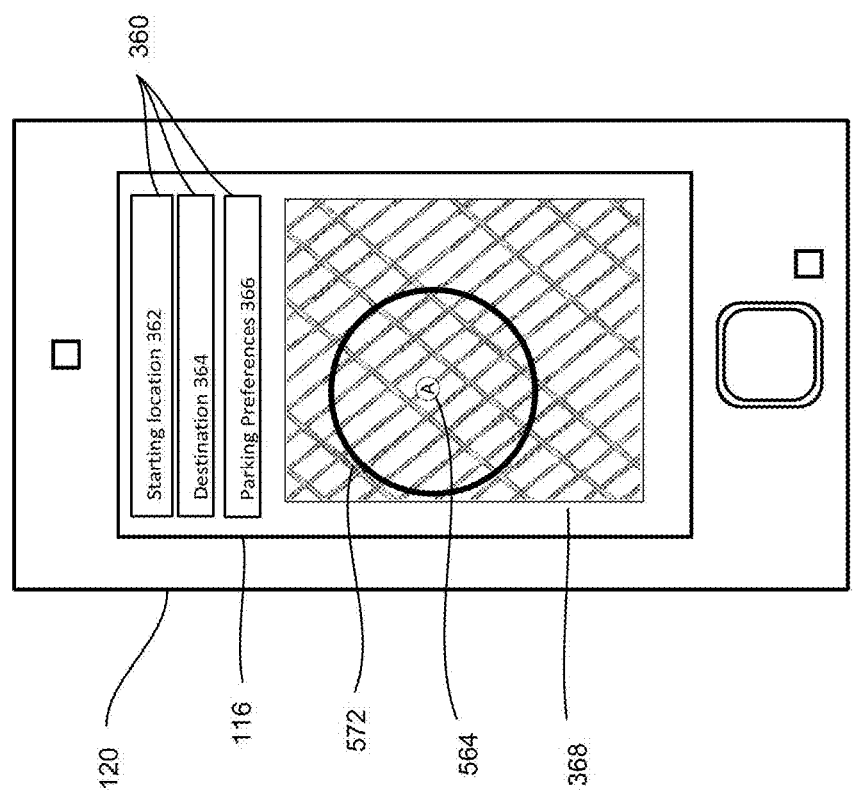

Alternatively, as shown in FIG. 5B, a number of blocks away from destination location 564 may be set. For example, the number of blocks away from the destination location 564 may be set to two (2) blocks. The system may create a search area 574 around destination location 564. The system may search for, find, and/or display a navigation route that maximizes the overall probability of finding an open parking location while minimizing the amount of time to find a parking location within that two (2) block radius surrounding destination location 564.

A parking duration, for example, may ensure compliance with parking restrictions and regulations. For example, if parking overnight, by selecting the appropriate duration for parking, the system may provide a route to a likely available parking location that allows for overnight parking. In some examples, the system filters out candidate parking locations that do not allow for overnight parking. In another example, parking may only be necessary for five (5) hours. The system may remove from the list of route suggestions a route that would lead the user to a location for two (2) hour parking.

In some instances, parking spaces may be designated for compact cars. If input to the parking preference field 366 specifies a larger vehicle, such as a full-size pickup truck, routes to designated compact spaces may be omitted by the system. Thus, the system may not provide a route that is designated for a compact car or a motorcycle as a larger vehicle will not fit. In other instances, a user may prefer to only park where it is free, instead of paid. By selecting whether free or paid parking is preferred under parking preferences 366, the system may remove from the results a route that would lead the user to an open spot in which they would have to pay for parking.

Figure 6:
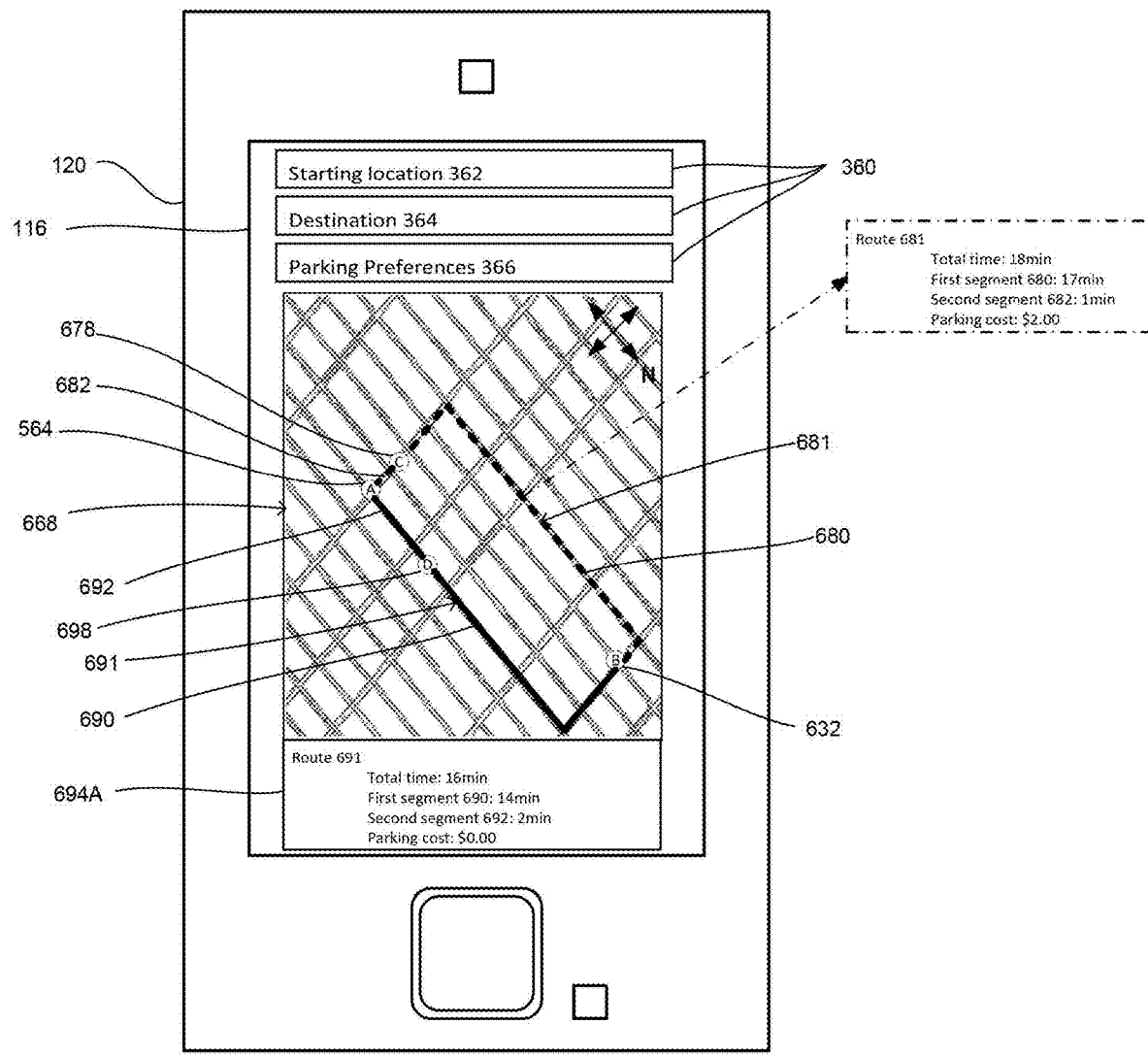
FIG. 6 is an example display of route suggestions in accordance with aspects of the disclosure.

FIG. 6 illustrates route suggestions between a starting location and a destination location including a candidate parking location at or near the destination location. The routes may include one or more segments. For example, each suggested route may include a first segment from the starting location to the candidate parking location and a second segment from the candidate parking location to the destination location. While only two segments are shown for each of the route suggestions, the route suggestions may include additional segments. For example, the routes may include one or more segments suggesting public transportation for a portion of the route. Additionally or alternatively, the route suggestion may include one or more segments that suggest ride sharing for that portion of the route. Accordingly, each route suggestion may include one or more segments.

The navigation system may determine one or more route suggestions 681, 691 based on a starting location 632, destination location 564, and candidate parking locations

678, 698. The candidate parking locations 678, 698 may be determined based on one or more selected parking preferences 366. Additionally or alternatively, the candidate parking locations 678, 698 may be determined based on historical parking availability, current parking availability, etc.

Each route suggestion 681, 691 may begin from starting location 632. Starting location 632 may be a current location of the user or a parking location from the previous navigation session. According to some examples, the current location of the user may be the parking location from the previous navigation session. For example, a user may use device 120 while in their vehicle to determine route suggestions to a destination location 564 including candidate parking location 678, 698 at or near destination location 564. According to some examples, the navigation system may determine that device 120 is within the vehicle based on a comparison of location data received from one or more sensors of device 120 and a parking location from a previous navigation session. If the location data received from one or more sensors of device 120 is within a predetermined threshold radius of the parking location from a previous navigation session, the navigation system may be determine that the current location of device 120 and, therefore the user, is the same or substantially the same as the parking location from the previous navigation session. According to some examples, if the current location of device 120 is outside of the predetermined threshold distance, the navigation system may determine that there has been additional driving since the last navigation session and, therefore, the current location of device 120 is not the same as the parking location from the previous navigation session. In such an example, the navigation system may use the current location device 120 as the default starting location 632.

In some examples, the navigation system may determine that there has been additional driving since the last navigation session based on location data received from one or more sensors, such as GPS sensors or motion sensors, microphones, wireless communications interfaces, etc. For example, the one or more sensors may detect user activity such as driving, running, cycling, etc. indicating that the user has changed their location since the last navigation session if the navigation system was not used during that time. The one or more sensors may include location sensors, motion sensors, and/or microphones. According to some examples, the change in location may be due to additional driving since the last navigation session. Additionally or alternatively, the wireless communications interfaces may determine location information based on Wi-Fi signals. The location information determined based on the Wi-Fi signals may be compared to determine whether device 120 has changed its location since the last navigation session. In some examples, the navigation system may determine whether device 120 was wirelessly coupled to the vehicle, but a navigation session was not initiated. In such an example, the navigation system may determine that there was driving since the last navigation session.

The system may include a database that stores historical parking availability. Historical parking availability may include, for example, information about what time spots have typically been available on specific days. According to one example, a spot may historically be available between 10:00 am and 10:15 am Monday-Thursday in front of a coffee shop, but on Friday-Sunday, that same spot is typically not available during that same time slot.

Further, the system may receive information collected by sensors on vehicles driving. For example, vehicle 122 may include a perception system or sensors on their exterior that are able to detect whether a parking location 342, 344, 348, 348 is occupied or if it is available. The sensors may include ultrasonic sensors, infrared sensors, electromagnetic sensors, cameras, or any of a variety of other types of sensors. The information collected by the sensors may, for example, be transmitted to server computing devices 130 at a central location. The server computing device 130 may then process the information and update the system in real time. As one example, the system may determine that a user looking for a parking space drove down a street having a spot indicated by the sensors to be available, but the user did not park in the identified spot. In this example, the system may infer that the identified spot is no longer available, such as if another vehicle parked in the spot in the interim. Thus, the system may use the most up-to-date status information pertaining to the availability of on-street parking. In some instances, the system may update on a schedule. For example, the system may be updated nightly to receive the information collected by the sensors. This information may, for example, be stored in the memory of the system as information related to historical parking availability.

In another example, the system may receive information by users currently using the system. For example, if user 124 drives down a first street with the intention of parking but does not park, the system may re-route or redirect another user to a second street, different from the first, if the other user was also looking for parking in that same geographical area. Thus, the system may recognize and update in real time that there was no parking on that first street.

In yet another example, when determining route suggestions 681 691, the system may take into account the time it will take to execute that route due to, for example, traffic or the time it takes to make turns. Therefore, each route 681 691, when taking into account the time it takes to execute, may have a different probability that the user 124 will find an open parking location. The system may also take into account information pertaining to whether a particular street has a parking lane 320 and/or relevant parking restrictions that would hinder a user's ability to park in that location. For example, by knowing whether or not a street has a parking lane 320, the system may automatically include or exclude that street when determining route suggestions. Further, by including details about the user's parking preferences, such as whether they wish to park overnight, the system will be able to include or exclude spots based on the preferences.

Additionally or alternatively, when determining route suggestions 681, 691, the system may take into account the time it will take for the user to travel from the candidate parking locations 678, 698 to destination location 564. For example, the system may take into account whether the user has to cross a busy street after parking at candidate parking locations 678, 698, the distance the user has to travel from candidate parking locations 678, 698 to destination location 564, how the user is going to get from candidate parking locations 678, 698 to destination location 564, etc.

In some examples, when determining route suggestions 681, 691, the system may take into account a start facing direction. The start facing direction may be the direction the user and/or vehicle travels in when leaving from starting location 632. In some examples, the start facing direction may be opposite the direction the user traveled to arrive at what is now starting location 632. For example, if the user traveled east to arrive at what is now starting location 632, the start facing direction for route suggestions 681, 691 may be west. In yet another example, the start facing direction may be the direction the vehicle is facing based on the parking location from the previous navigation session. For example, if the parking location from the previous navigation session was on-street parking while the vehicle was traveling east, the start facing direction may be east.

According to some examples, each route suggestion 681 691 may be assigned a score, based on one or more of the factors listed above. For example, the score may be based on efficiency, including turn costs and traffic, as well as the probability of a likely available spot. The turn costs may, for example, account for a first proportion of the total score, such as a maximum turn cost score of twenty-five percent (25%) of the total score. Thus, for a country or state in which vehicles drive on the right-hand side of the road, if there are more left turns, i.e. turns which require the vehicle to turn across oncoming traffic, the percentage of the score for turn costs may decrease. For example, each route 681, 691 has one (1) left turn; the score for turn costs of routes 681, 691 may be higher at e.g. twenty percent (20%), i.e. 20/100. In some examples, if the route suggestions had two (2) left turns, the score for turn costs may be higher at e.g. twenty percent (20%), i.e. 20/100. Traffic, both in real-time and historic, may, for example, account for a second proportion of the total score, such as a maximum traffic score of fifty percent (50%) of the total score. Thus, in instances where there is more traffic, in real time and/or based on historic information, the percentage of the score for traffic may decrease. For example, route 691 may be along a main road, which may have historically increased traffic; the traffic score for route 691 may be thirty percent (30%), i.e. 30/100. Route 681 may have less traffic in real time and historically; the traffic score for route 681 may be higher at e.g. forty percent (40%), i.e. 40/100. The probability of a likely available parking location may, for example, account for a third proportion of the total score. This may be the remainder of the available maximum score, such as a maximum 'likely availability' score of twenty-five percent (25%) of the total score. The probability of a likely available parking location may be based on both historical parking information and real-time information that may be received from the system and/or perception systems. Thus, in instances where probability of a likely available parking location is low, the percentage of the score for likely available parking may decrease. For example, route 681 may only consist of roads with on-street parking locations, and no parking lanes; the score for likely available parking for route 681 may be fifteen percent (15%), i.e. 15/100. Route 691 may include roads with both on-street parking locations and parking lanes; the score for likely available parking for route 691 may be higher at e.g. twenty-two percent (22%), i.e. 22/100. In examples where the user is going to walk from candidate parking locations 678, 698 to destination location 564, the score for the final segment of the route may be based on how far the user has to walk, how many times they have to cross the street, etc. A shorter walk and/or one with fewer street crossings may have a higher score than a longer walk and/or one with many street crossings. Additionally or alternatively, each route suggestion may be scored based on a start facing direction. For example, a route suggestion that aligns with the start facing direction may have a higher score than a route suggestion that requires the user to turn around. The above is just an example and it should be understood that alternative computations are possible. Moreover, more or less factors may be included in assigning a score to a route.

The suggested routes 681, 691 with the best, or highest, score may be sent to device 120. According to some examples, the suggested route with the best, or highest score, may be highlighted as the best potential route. For example, the route with the best and/or highest score may be shown in a first color while the next best route may be shown in a second color. In some examples, the route with the best and/or highest score may be selected as default while the next best route may be an option for a user to select.

Finding a spot becomes even more efficient as more factors are included when calculating a route 681, 691 for the user 124 to follow in their vehicle. Moreover, this system may be used not only for finding street parking but it may also be used for finding parking in a parking lot or a parking garage using the same factors.

As shown in FIG. 6, two route suggestions 681, 691 may be provided in response to the determined starting location 632, selected destination location 564 and parking preferences 366, and/or identified candidate parking locations 678, 698. Each route suggestion 681, 691 may have two segments. The first segment 680, 690 may be from starting location 632 to candidate parking locations 678, 698. The second segment 682, 692 may be from candidate parking locations 678, 698 to destination location 564.

According to some examples, candidate parking location 678 for route 681 may be closer to destination location 564 as compared to candidate parking location 698 for route 691. However, route 691 may be the higher ranking score. According to some examples, a route suggestion 681, 691 may be ranked higher when a start facing direction of the vehicle corresponds to the initial direction of travel. For example, the vehicle at starting location 632 may be facing east. The initial direction of travel for route 681 may be west while the initial direction of travel for route 691 may be east. In such an example, at least the portion of the score related to initial direction of travel for route 691 may rank higher than route 681 as the initial direction of travel corresponds to the start facing direction of the vehicle. In some examples, the totality of factors related to route 691 may result in route 691 having a higher score than route 681. For example, the time it takes to drive between starting location 632 and candidate parking locations 678, 698 may be shorter for route 691 as compared to route 681. According to some examples, the candidate parking location 698 may match more of the selected parking preferences 366 as compared to candidate parking location 678. Thus, the navigation system may consider a totality of the factors, e.g., initial direction of travel, start facing direction, parking preferences, etc., to determine and/or rank route suggestions 681, 691.

Information 694 regarding each route suggestion 681, 692 may be displayed in conjunction with map 668 displaying route suggestions 681, 691. For example, when a user selects a route suggestion 681, 691 the information 694 about that route may be displayed. Additionally or alternatively, the system may, by default, display information 694 for the route 681, 691 with the highest score. The information 694 may include, for example, the total travel time to reach destination location 564 from starting location 632 including parking at candidate parking location 692. In some examples, the information 694 may include the time it will take to travel each segment 690, 692. Information 694 may further include information regarding the parking costs, maximum parking duration, etc. for candidate parking location 698. While FIG. 6 shows information 694A as being displayed below map 668, information 694B may be a pop-up window that appears when a route suggestion is selected. For example, if route 681 is selected, a pop-up window with information 694B may be overlaid on map 668. Information 694B may include details pertaining to route 681 similar to details provided in information 694A.

Figure 7:
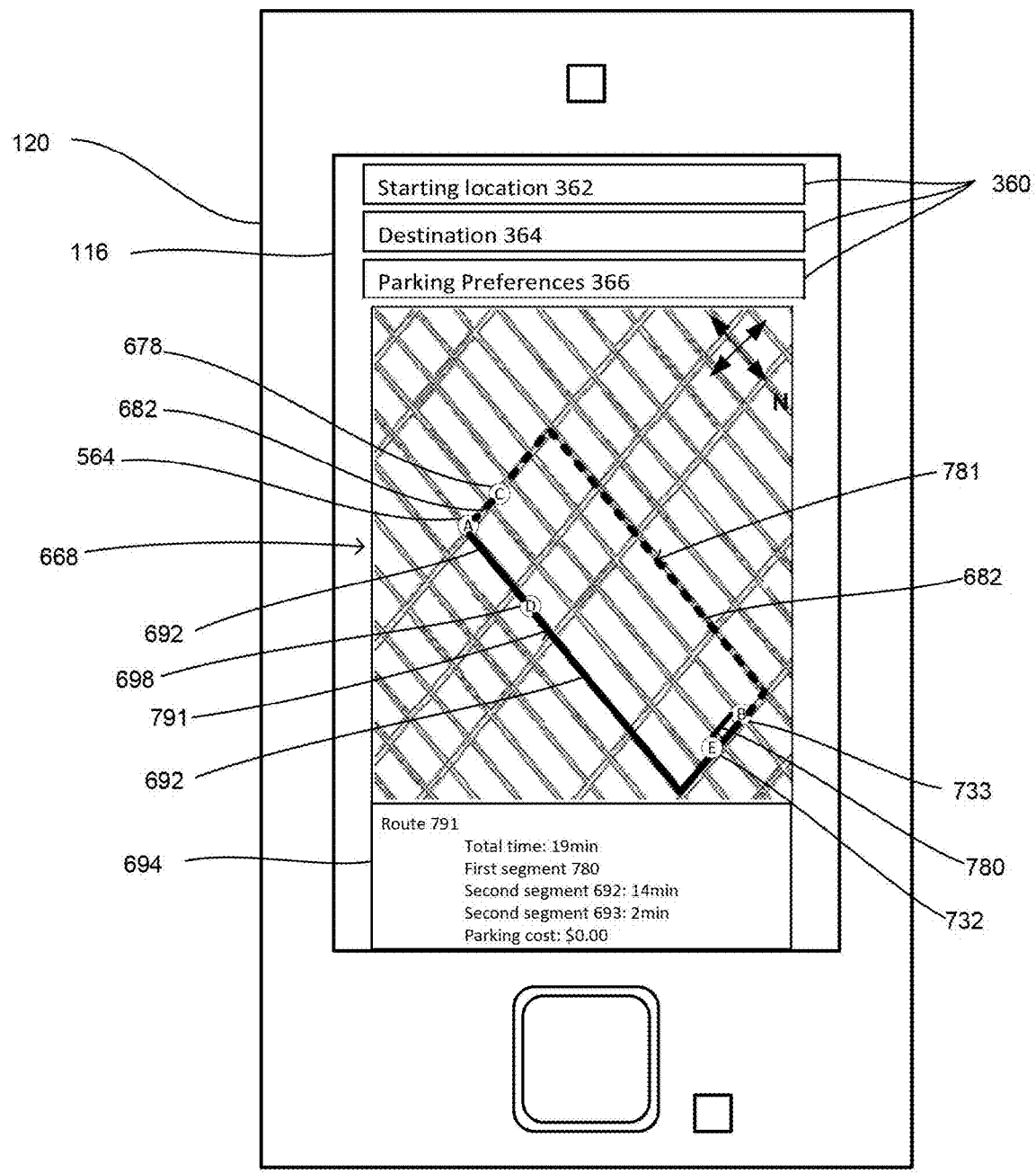
FIG. 7 is another example display of route suggestions in accordance with aspects of the disclosure.
Figure 8:
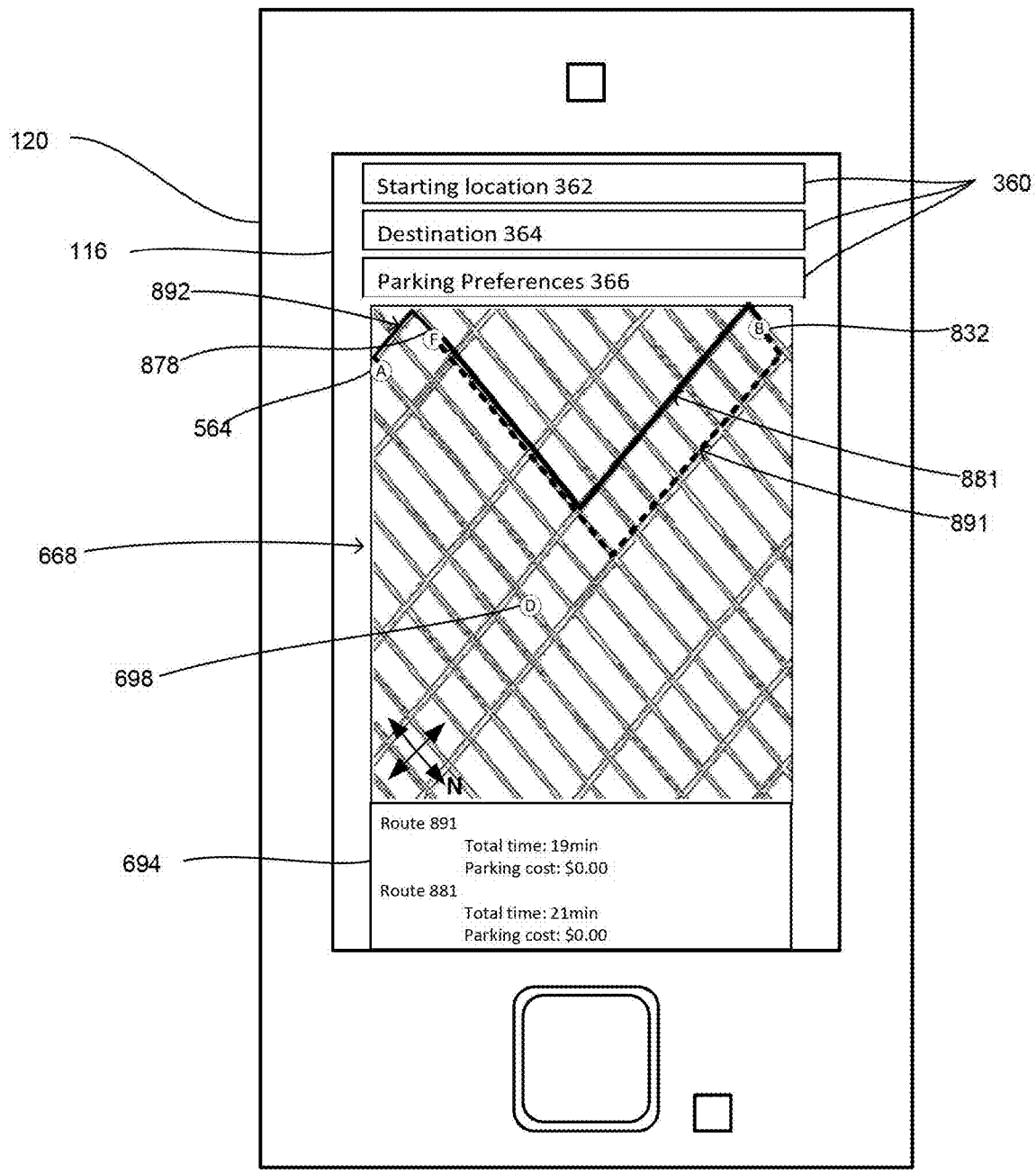
FIG. 8 is yet another example display of route suggestions in accordance with aspects of the disclosure.

FIGS. 7 and 8 illustrate route suggestions between a starting location and a destination location including a candidate parking location at or near the destination location. The route suggestions may be determined by the navigation system using methods similar to those described above and herein. The routes may include a first segment from the starting location to the location of a vehicle, a second segment from the location of the vehicle to a candidate parking location, and a third segment from the candidate parking location to the destination location. According to some examples, the starting location may be the current location of the user such that the first segment returns the user to their vehicle.

In some examples, the first segment may be from the current location to a location for mass transit, such as a bus stop, subway, trolley, etc., the second segment may be from the first stop of the mass transit to a second stop of the mass transit at or near the destination location, and the third segment may be from the second stop to the destination location. In some examples, instead of mass transit, the transportation may be to a ride sharing location, car sharing location, bicycle rental location, etc. Moreover, while only three segments are shown, there may be more or less than three segments for a potential route. Thus, the examples provided herein are merely exemplary and are not intended to be limiting.

As shown in FIG. 7, route suggestions 781, 791 may include a first segment 780 from a current location 732 of a user to the location of the user's vehicle 733, a second segment 682, 692 from the location of the user's vehicle 733 to candidate parking locations 678, 698, and a third segment from candidate parking locations 678, 698 to destination location 564.

According to some examples, the system may determine that the current location 732 of the user is different from the location of the user's vehicle based on a comparison of current location data of device 120 with the parking location 733 from a previous navigation session. In examples where the current location of the user does not match the parking location 733 from the previous navigation session, the navigation system may provide a first segment 780 for each of route suggestions 781, 791 to return the user to the vehicle location 733. According to some examples, the system may determine whether to provide the first segment 780 based on the distance between the current location 732 of the user and the parking location 733 from the previous navigation session. For example, if the distance between the current location 732 of the user and the parking location 733 from the previous navigation session is within a predetermined threshold, the system may provide a first segment 780 of route suggestions 781, 791 to return the user to their vehicle. Additionally or alternatively, if the distance between the current location 732 of the user and the parking location 733 from the previous navigation session is greater than a predetermined threshold, the system may determine that there has been additional driving since the last navigation session and, therefore, use the current location 732 of the user as the starting location.

In some examples, the navigation system may provide route suggestions using various modes of transportation for the first segment 780. For example, the navigation system may indicate how long it would approximately take for the user to walk or ride a bicycle, how long it would take and how expensive it would be if they used a ride share, available public transit such a bus or subway, etc.

Additionally or alternatively, the navigation system may determine a start facing direction. The start facing direction may be the direction the user was traveling in when they arrived at the candidate parking location from the previous navigation session. For example, as shown in FIG. 7, when parking the vehicle at parking location 733, the user may have been traveling east. In such an example, the start facing direction may be east.

According to some examples, the navigation system may be employed to arrive at a first destination location from a first starting location. The navigation system may provide a route that has the user traveling east to arrive at the first destination location. After spending some time at the first destination location, the navigation system may be employed to return to the first starting location. According to some examples, the start facing direction to return to the first location may be opposite the direction the user traveled to arrive at the first destination location. For example, if the user traveled east to arrive at the first destination location, the start facing direction to return to the starting location may be west.

As shown in FIG. 8, route suggestions 881, 891 may include a first segment from a starting location 832 to candidate parking location 878 and a second segment 892 from the candidate parking location 878 to destination location 564.

According to some examples, when determining the starting location 832, the system may determine whether there has been additional driving since the previous navigation session. The system may use data from one or more sensors, such as location sensors 114 and/or motion sensors. For example, the system may determine the current location of a user based on location data provided by location sensors 114 of device 120. In some examples, when the distance between the current location of the user and a parking location of the previous navigation session 698 is greater than a predetermined distance, the system may determine that there has been additional driving since the last navigation session. In such an example, the system may use the current location of the user as the starting location 832 instead of the parking location of the previous navigation session 698. In some examples, device 120 may include motion sensors that can detect activity, such as driving, train or bus riding, etc. Based on the detected activity, the system may determine that there has been additional driving since the last navigation session. In such an example, the system may suggest the current location of the user as the starting location 832.

In another example, wireless communications interfaces may be used to determine location information. For example, wireless communications interfaces may be used to detect Wi-Fi signals, which may be used to determine location information. In some examples, where the distance between the current location of the user, determined based on detected Wi-Fi signals, and the parking location 698 from the previous navigation session is greater than a predetermined threshold, the system may determine that there has been additional driving since the last navigation session.

In yet another example, the wireless communications interfaces may be used to determine whether the device 120 was wirelessly connected to a vehicle. For example, the system may determine that the device was wirelessly connected to the vehicle since the previous navigation session but navigation was not used during the subsequent connection. In such an example, the system may determine that there has been additional driving since the previous navigation session.

Additionally or alternatively, the system may determine an amount of time that has passed since the system was last used. For example, if the previous navigation session provided directions to return to the user's home and multiple days have passed since then, the system may determine that there has been additional driving.

In the example shown in FIG. 8, a user may employ the navigation system to arrive at a first destination location. The user may have parked at the candidate parking location 698 suggested by the navigation system as part of the route to the first destination location. After spending time at the first destination location, the user may leave the first destination location and go to a second destination location without employing the navigation system to get to the second destination location. The user may then employ the navigation system to proceed to a third destination location 564. In such an example, the navigation system may determine that there has been additional driving since parking at candidate parking location 698. For example, the navigation system may determine the distance between the user's current location 832 and the parking location 698 from the previous navigation system is greater than a predetermined threshold. In such an example, the navigation system may set the starting location 362 for the navigation session as the user's current location 832.

Figure 9:
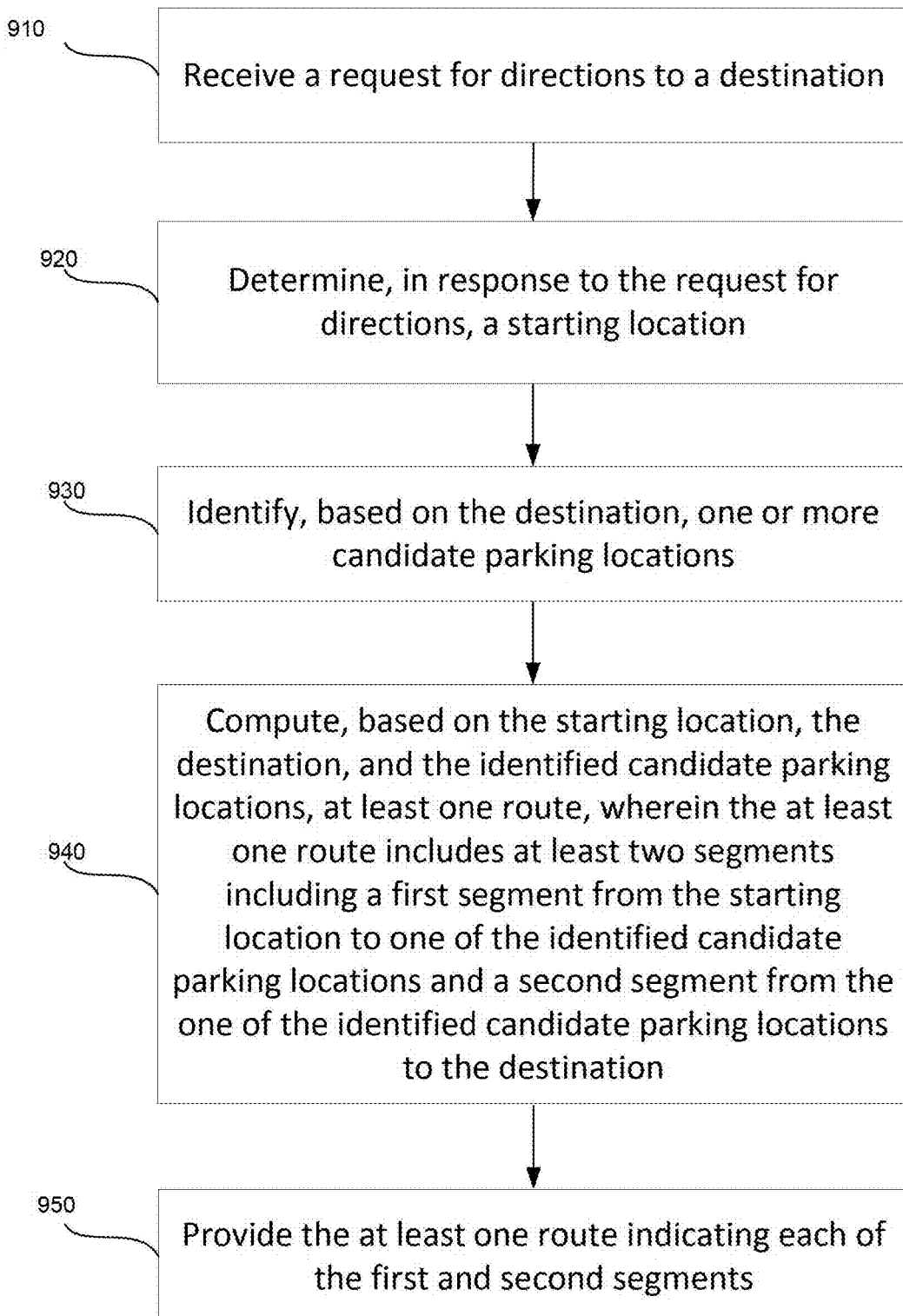
FIG. 9 is an example method of providing route suggestions with two or more segments in accordance with aspects of the disclosure.

FIG. 9 illustrates an example method for providing route suggestions indicating one or more segments. The following operations do not have to be performed in the precise order described below. Rather, various operations can be handled in a different order or simultaneously, and operations may be added or omitted.

In block 910, the navigation system may receive a request for directions to a destination location. For example, the destination location may be an address, business name, landmark, geographic coordinates, etc.

In block 920, the navigation system may determine, in response to the request for directions and based on a previous navigation session, a starting location. For example, the starting location may include a current location of a user or a parking location from the previous navigation session. According to some examples, the navigation system may determine that the current location of the user is different than the parking location from the previous navigation session.

In block 930, the navigation system may identify, based on the destination location, one or more candidate parking locations. Candidate parking locations may be determined based on information pertaining to the destination location and/or the geographical area surrounding the destination location. For example, the navigation system may store information regarding whether there is on-site parking at the destination location, whether there is nearby street parking, public parking lots and/or garages at and/or near the destination location, the cost of parking at a given location, historical parking availability, parking restrictions, etc. The navigation system may use this information along with any other route preferences to determine if there are candidate parking locations at and/or near the destination location. Route preferences may, for example, total travel time, total travel distance, cost of parking, maximum duration of parking, type of parking, distance to the destination location, etc.

In block 940, the navigation system may compute, based on the starting location, the destination location, and the identified candidate parking locations, at least one route. According to some examples, the navigation system may include two or more routes. The route suggestions may include at least two segments. The first segment may be from the starting location to one of the identified candidate parking locations and the second segment may be from the identified candidate parking location to the destination location.

In some examples, the navigation system may determine a mode of transportation for each segment. For example, the navigation system may determine a first mode of transportation for the first segment and a second mode of transportation for the second segment different than the first mode of transportation. Modes of transportation may include, for example, a personal vehicle, ride sharing, bicycle, walking, trolley, bus, train, subway, taxi, etc.

In some examples, when the current location of the user is different from the parking location from the previous navigation session, the navigation system may determine a third segment. The third segment may be from the current location of the user to the parking location from the previous navigation session.

In block 950, the navigation system may provide the at least one route indicating each of the first and second segments. In examples where two or more routes are provided, the routes may be ranked based on route preferences.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method, comprising:
receiving, by one or more processors, a request for directions to a destination location;
determining, by the one or more processors in response to the request for directions, a starting location;
identifying, by the one or more processors based on the destination location, one or more candidate parking locations;
computing, by the one or more processors based on the starting location, the destination location, and the identified one or more candidate parking locations, at least one route, wherein the at least one route includes at least two segments including a first segment from the starting location to one of the identified one or more candidate parking locations and a second segment from the one of the identified one or more candidate parking locations to the destination location;
determining, by the one or more processors based on a last facing direction from the first segment, a start facing direction for the second segment corresponding to the last facing direction, wherein the last facing direction is a direction of travel for a last portion of the first segment; and
providing, by the one or more processors, the at least one route indicating each of the first and second segments, wherein a route for the second segment begins in the start facing direction.

2. The method of claim 1, wherein the starting location includes a current location of a user or a parking location from a previous navigation session.

3. The method of claim 2, further comprising determining, by the one or more processors, that the current location of the user is different from the parking location from the previous navigation session.

4. The method of claim 3, wherein when the current location of the user is different from the parking location from the previous navigation session, the method further comprises:
computing, by the one or more processors, a third segment from the current location of the user to the parking location from the previous navigation session; and
providing, by the one or more processors, the at least one route further indicating the third segment.

5. The method of claim 2, further comprising:
computing, by the one or more processors, a third segment from the current location of the user to the parking location from the previous navigation session; and
providing, by the one or more processors, the at least one route indicating the third segment.

6. The method of claim 1, further comprising providing two or more routes, wherein each of the two or more routes are ranked based on route preferences.

7. The method of claim 6, wherein route preferences include at least one of total travel time, total travel distance, cost of parking, maximum duration of parking, or type of parking.

8. The method of claim 1, further comprising determining, by the one or more processors, a first mode of transportation for the first segment and a second mode of transportation for the second segment different than the first mode of transportation.

9. The method of claim 1, wherein the direction of travel corresponds to a direction a vehicle is facing when parked in one of the identified one or more candidate parking locations.

10. A device, comprising:
a memory;
one or more processors coupled to the memory, the one or more processors being configured to:
receive a request for directions to a destination location;
determine, in response to the request for directions, a starting location;
identify, based on the destination location, one or more candidate parking locations;
compute, based on the starting location, the destination location, and the identified one or more candidate parking locations, at least one route, wherein the at least one route includes at least two segments including a first segment from the starting location to one of the identified one or more candidate parking locations and a second segment from the one of the identified one or more candidate parking locations to the destination location;
determine, based on a last facing direction from the first segment, a start facing direction for the second segment corresponding to the last facing direction, wherein the last facing direction is a direction of travel for a last portion of the first segment; and
provide the at least one route indicating each of the first and second segments, wherein a route for the second segment begins in the start facing direction.

11. The device of claim 10, wherein the starting location includes a current location of a user or a parking location from a previous navigation session.

12. The device of claim 11, wherein the one or more processors are further configured to determine that the current location of the user is different from the parking location from the previous navigation session.

13. The device of claim 12, wherein when the current location of the user is different from the parking location from the previous navigation session, the one or more processors are further configured to:
compute a third segment from the current location of the user to the parking location from the previous navigation session; and
provide the at least one route further indicating the third segment.

14. The device of claim 11, wherein the one or more processors are further configured to:
compute a third segment from the current location of the user to the parking location from the previous navigation session; and
provide the at least one route indicating the third segment.

15. The device of claim 10, wherein the one or more processors are further configured to provide two or more routes, wherein each of the two or more routes are ranked based on route preferences.

16. The device of claim 15, wherein route preferences include at least one of total travel time, total travel distance, cost of parking, maximum duration of parking, or type of parking.

17. The device of claim 10, wherein the one or more processors are further configured to determine a first mode of transportation for the first segment and a second mode of transportation for the second segment different than the first mode of transportation.

18. The system of claim 10, wherein the direction of travel corresponds to a direction a vehicle is facing when parked in one of the identified one or more candidate parking locations.

19. A non-transitory computer readable storage medium storing instructions, which when executed by one or more processors, cause the one or more processors to:
receive a request for directions to a destination location;
determine, in response to the request for directions, a starting location;
identify, based on the destination location, one or more candidate parking locations;
compute, based on the starting location, the destination location, and the identified one or more candidate parking locations, at least one route, wherein the at least one route includes at least two segments including a first segment from the starting location to one of the identified one or more candidate parking locations and a second segment from the one of the identified one or more candidate parking locations to the destination location;
determine, based on a last facing direction from the first segment, a start facing direction for the second segment corresponding to the last facing direction, wherein the last facing direction is a direction of travel for a last portion of the first segment; and
provide the at least one route indicating each of the first and second segments, wherein a route for the second segment begins in the start facing direction.

20. The non-transitory computer-readable medium of claim 19, wherein the starting location includes a current location of a user or a parking location from a previous navigation session.

21. The non-transitory computer-readable medium of claim 20, wherein the one or more processors are further configured to determine that the current location of the user is different from the parking location from the previous navigation session.

22. The non-transitory computer-readable medium of claim 21, wherein when the current location of the user is different from the parking location from the previous navigation session, the one or more processors are further configured to:
  compute a third segment from the current location of the user to the parking location from the previous navigation session; and
  provide the at least one route further indicating the third segment.

23. The non-transitory computer-readable medium of claim 20, wherein the one or more processors are further configured to:
  compute a third segment from the current location of the user to the parking location from the previous navigation session; and
  provide the at least one route indicating the third segment.

24. The non-transitory computer-readable medium of claim 19, wherein the one or more processors are further configured to provide two or more routes, wherein each of the two or more routes are ranked based on route preferences.

25. The non-transitory computer-readable medium of claim 24, wherein route preferences include at least one of total travel time, total travel distance, cost of parking, maximum duration of parking, or type of parking.

26. The non-transitory computer-readable medium of claim 19, wherein the one or more processors are further configured to determine a first mode of transportation for the first segment and a second mode of transportation for the second segment different than the first mode of transportation.

27. The non-transitory computer-readable medium of claim 19, wherein the direction of travel corresponds to a direction a vehicle is facing when parked in one of the identified one or more candidate parking locations.

* * * * *